(12) United States Patent
Sales Casals

(10) Patent No.: US 9,927,593 B2
(45) Date of Patent: Mar. 27, 2018

(54) OPTICAL FIBERS DEPLOYMENT IN THE LAST MILE

(71) Applicant: PRYSMIAN S.p.A., Milan (IT)

(72) Inventor: Lluis Ramon Sales Casals, Milan (IT)

(73) Assignee: PRYSMIAN S.p.A., Milan (IT)

(*) Notice: Subject to any disclaimer, the term of this patent is extended or adjusted under 35 U.S.C. 154(b) by 0 days.

(21) Appl. No.: 15/504,426

(22) PCT Filed: Sep. 16, 2014

(86) PCT No.: PCT/EP2014/069740
§ 371 (c)(1),
(2) Date: Feb. 16, 2017

(87) PCT Pub. No.: WO2016/041587
PCT Pub. Date: Mar. 24, 2016

(65) Prior Publication Data
US 2017/0235083 A1 Aug. 17, 2017

(51) Int. Cl.
*G02B 6/44* (2006.01)
*G02B 6/46* (2006.01)
*H04B 10/25* (2013.01)

(52) U.S. Cl.
CPC ......... *G02B 6/4475* (2013.01); *G02B 6/4466* (2013.01); *G02B 6/4495* (2013.01); *G02B 6/46* (2013.01); *H04B 10/2504* (2013.01)

(58) Field of Classification Search
CPC ........ G02B 6/443; G02B 6/4494; G02B 6/44; G02B 6/4433; G02B 6/4429; G02B 6/4471
See application file for complete search history.

(56) References Cited

U.S. PATENT DOCUMENTS

| 6,215,930 | B1 | 4/2001 | Estes et al. |
| 7,394,984 | B1 | 7/2008 | Woodward |
| 7,738,790 | B2* | 6/2010 | Nozue ................. H04J 14/0282 398/69 |
| 7,865,081 | B1 | 1/2011 | Woodward |
| 2007/0071392 | A1 | 3/2007 | Baucom et al. |
| 2008/0112675 | A1 | 5/2008 | Lewallen et al. |

OTHER PUBLICATIONS

International Search Report issued May 20, 2015 in PCT/EP2014/069740 filed Sep. 16, 2014.

* cited by examiner

*Primary Examiner* — Jennifer Doan
(74) *Attorney, Agent, or Firm* — Oblon, McClelland, Maier & Neustadt, L.L.P.

(57) ABSTRACT

A method for connecting a number of users with at least one signal bearing optical fiber contained in an optical cable. The method includes: a) interrupting the signal bearing optical fiber at a first branch point, obtaining a first optical fiber segment upstream of the branch point and a second optical fiber segment downstream of the branch point; b) providing an optical splitter at the branch point, the optical splitter including an input and two outputs; c) coupling the first optical fiber segment with the input of the optical splitter; d) coupling a first output of the optical splitter with a first user; e) coupling a second output of the optical splitter with a downstream optical fiber segment of an interrupted optical fiber contained in the optical cable; and f) coupling the downstream optical fiber segment with at least one further user at a further branch point downstream the first branch point.

12 Claims, 2 Drawing Sheets

OPTICAL FIBERS DEPLOYMENT IN THE LAST MILE

BACKGROUND OF THE INVENTION

Field of the Invention

The present invention relates to an optical network arrangement for connecting a plurality of users, even in relatively high number, with a reduced number of optical fibers, and particularly to the deployment of cables for the connection of users to optical networks.

Overview of the Related Art

The deployment of broadband telecommunications networks calls for using optical fibers for the so-called "last mile", i.e. the last trunk of the telecommunications network to which network termination devices, like for instance modems, network termination units (NTU) or, set-top boxes for receiving cable television services are directly connected. User devices such as computers, IP (Internet Protocol) phones and similar devices connect to the broadband telecommunications network via the network termination device.

Typically, the deployment of the last mile of an optical telecommunication network provides for the lay in the field of optical cables containing a plurality of optical fibers, for instance in a number variable from 6 to 48. The cables are routed through conduits that can for example develop through or along the walls of a multi-floor building, often for more or less vertical segments, or, in the case of separate buildings set in succession along a city street, the optical cables extend horizontally through conduits preferably located under of the ground level.

Typically, an optical cable of the type adapted for this use includes a tubular element, or sheath, inside which several optical fibers are placed. Depending on the specific type of application, the optical fibers can be accommodated within the sheath without protections, or they may be covered by a protective coating, or they may also be gathered in independent groups (also referred to as microcables or micromodules) contained in a thin tubular coating.

In order to make the connection of the different users to the optical network, it is necessary to lead one or more optical fibers to the sites (apartments, houses, offices) of the users. To this end, openings need to be made in the sheath of the optical cables, so as to be able to access the optical fibers accommodated within each cable. Through such openings, the optical fibers can be at least partially drawn out, extracted from the cable and routed where needed, for example to sockets provided for in the premises of the users, to which the respective users can be connected.

An example of such deployment is provided by WO 2009/113112 in the name of the same present Applicant, wherein optical fiber units contained in an optical cable are connected to users by means of the phases of: providing an opening in a sheath of the optical cable to access the optical fiber units contained in the optical cable; extracting a segment of at least one optical fiber unit from the optical cable through the opening; inserting a free end of the extracted segment of optical fiber unit into a protection tube; making the protection tube slide on the extracted segment of optical fiber unit to insert an end portion of the protection tube, distal from the free end of the extract segment of the optical fiber unit, into the optical cable through the opening; positioning a closure element on the optical cable in correspondence of the opening so as to substantially realize a closure thereof; securing in removable way the closure element to the optical cable and bringing the free end of the extracted segment of optical fiber unit in correspondence of a connection point of a user device.

Another type of deployment for connecting different users is disclosed, for example, in WO 2006/13655, wherein an optical cable is disclosed containing several optical microcables where two openings in the external sheath are made: a first opening in correspondence of the point at which the cabling for the connection of a subscriber has to be realized, and a second opening downstream thereof, at a distance of the order of about some meters or tens of meters from the first opening. One of the optical microcables contained in the optical cable is selected (for example based on its color) and cut in correspondence of the second opening, and the segment of microcable between the first opening and the point of cut is then extracted from the optical cable through the first opening. The extracted microcable segment is then inserted into a pre-installed microconduit that extends to the connection point of the subscriber, or, depending on the circumstance, to a branch box.

Finally, US 2008/0240662 discloses a duplicated use of optical fibers in an optical cable. The optical cable comprises a main optical fiber module and a secondary optical fiber module. Optical fibers of the main optical fiber module are sectioned, at one end, and connected to optical fibers of the secondary optical fiber module in order to form a connection loop.

SUMMARY OF THE INVENTION

It often happens that the optical cable has to be passed through conduits already existing in buildings or other infrastructures, originally intended to contain other types of cables, for instance for the distribution of electric energy and/or of television and/or telephone signals and/or other optical fiber cables. This is for example the case where optical fibers have to be deployed in buildings or beneath infrastructures built in relatively remote past times. It also often happens that the optical cable has to be passed through conduits located under ground level along streets and roads, and these conduits may already be occupied with existing other cables. Therefore, a very limited space may be available for the lay of optical cables to the extent that the number of optical fibers comprised in the optical cable which can be laid could not suffice for coupling of all the users to be connected with the optical network.

In view of the above, the Applicant has observed that known prior art deployment systems and methods do not provide a satisfying solution adapted to allow utilization of congested ducts, that would otherwise not support conventional realizations for maximizing the fiber efficiency of an optical network.

The Applicant has found that it is possible, in the same cable, taking out an optical fiber through which an optical signal propagates, interrupting said optical fiber in a point of the cable, splitting the optical signal of such interrupted optical fiber into split optical signals at said point, as required to connect a user, and, downstream of the interruption, continuing to propagate at least some of the split optical signals to further users, by injecting such some split optical signals into the same optical fiber after the interruption thereof, or/and, if available, into further interrupted optical fibers of the cable, thereby achieving the result of connecting a high number of users with a reduced number of optical fibers.

The present invention relates to a method for connecting users, even in relatively high number, with an optical fiber contained in an optical cable, comprising the steps of interrupting the optical fiber at a branch point obtaining a first corresponding optical fiber segment upstream of said branch point and a second corresponding optical fiber segment downstream of said branch point; providing an optical splitter at the branch point which comprises an input and at least two outputs; coupling the first corresponding optical fiber segment to the input of the optical splitter provided at the branch point; coupling a first output of the optical splitter with at least one user; coupling the second output of the optical splitter at the branch point to the second corresponding optical fiber segment or to a further optical fiber segment of a further interrupted optical fiber.

In one embodiment of the invention, said downstream optical fiber segment of an interrupted optical fiber is said second optical fiber segment.

In one embodiment of the invention, in which said downstream optical fiber segment of an interrupted optical fiber is an idle optical fiber segment of a further optical fiber.

In one embodiment of the invention, the method further comprises the step of coupling the first optical fiber segment at one end thereof with a network element for propagating one or more optical signals from/to the network element to/from the user and/or the further user.

In one embodiment of the invention, the method further comprises the following steps: interrupting the second optical fiber segment at the further branch point, and providing a further optical splitter at the further branch point, the further optical splitter comprising an input and at least two outputs; coupling the second optical fiber segment with the input of the further optical splitter provided at the further branch point, and coupling one of the at least two outputs of the further optical splitter with the at least one further user.

In one embodiment of the invention, the method further comprises repeating the following steps: coupling said downstream optical fiber segment with at least one further user at a further branch point downstream the first branch point; interrupting the second optical fiber segment at the further branch point, and providing a further optical splitter at the further branch point, the further optical splitter comprising an input and at least two outputs; coupling the second optical fiber segment with the input of the further optical splitter provided at the further branch point, and coupling one of the at least two outputs of the further optical splitter with the at least one further user in correspondence of at least one subsequent branch point downstream said further branch point.

In one embodiment of the invention, the step of coupling a first output of the optical splitter with a first user comprises coupling the first output of the optical splitter with a further idle optical fiber segment of an another further optical fiber contained in the optical cable.

In one embodiment of the invention, the step of coupling a second output of the optical splitter with a downstream optical fiber segment of an interrupted optical fiber contained in the optical cable comprises segregating the downstream optical fiber segment at the further branch point, obtaining the idle optical fiber segment upstream the further branch point.

In one embodiment of the invention, the at least one signal bearing optical fiber comprises a plurality of signal bearing optical fiber grouped in optical fiber modules and wherein the step of interrupting said signal bearing optical fiber at a first branch point, obtaining a first optical fiber segment upstream of said branch point and a second optical fiber segment downstream of said branch point comprises segregating all the optical fibers of a same optical fiber modules at the same branch point, and wherein the steps of providing an optical splitter at the branch point and coupling the first optical fiber segment with the input of the optical splitter comprises providing a respective optical splitter for each optical fiber of the same optical fiber module, and coupling the first optical fiber segment of each optical fiber of the same module with the input of the respective optical splitter.

In one embodiment of the invention, the downstream optical fiber segment of an interrupted optical fiber comprises a plurality of downstream optical fiber segments grouped in idle optical fiber modules contained in the optical cable, wherein the further branch point comprises a respective further branch point for each one of the idle optical fiber modules, and wherein the step of coupling said downstream optical fiber segment with at least one further user at a further branch point downstream the first branch point comprises coupling each of said downstream optical fiber segments grouped in idle optical fiber modules with at least one further user at the respective further branch point of the idle optical fiber modules downstream the first branch point.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION OF THE INVENTION

Figure 1:
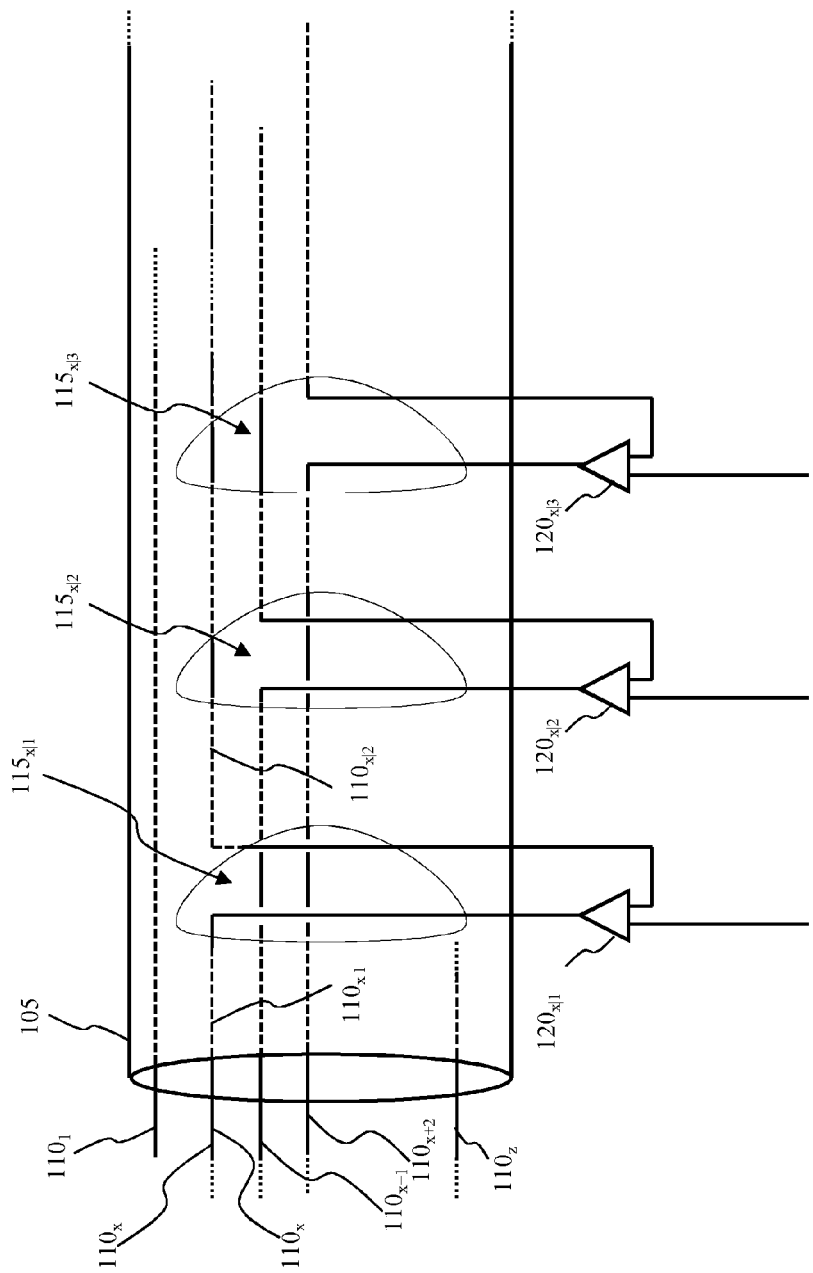
FIG. 1 is a schematic diagram of optical fibers deployment according to an embodiment of the present invention.

For the purposes of the present description and claims an optical cable is deemed to be an optical cable comprising one or more optical fibers, possibly arranged inside one or more buffer tubes, an outer sheath and, optionally, one or more strength members.

An optical fiber is typically constituted by an optical waveguide, constituted by an optically transmissive core, surrounded by a cladding; core and cladding are preferably constituted by silica-based material, and the material of the cladding has a refraction index lower than the refraction index of the material of the core, for substantially confining the optical radiation within the core. The optical waveguide is preferably covered by at least one protective coating layer ("coating"); typically two protective coating layers are present: the first coating layer ("primary coating") is in direct contact with the optical waveguide, while the second coating layer ("secondary coating") covers the primary coating. In addition, a buffer layer may cover each optical fiber, the buffer layer may be substantially in contact with the secondary coating ("tight buffer") or it may consist of a small tube of inner diameter somehow larger than the outer diameter of the secondary coating ("loose buffer"). The coating layers may be colored by means of suitable inks for an easier identification of the different optical fibers accommodated within the optical cable.

The optical fibers may be arranged in various ways in the cable.

In the so-called "central loose tube cables" (briefly, CLT cables), the optical fibers are loosely arranged within a single buffer tube, which is in turn enclosed by the external sheath.

In the so-called "multi loose tube cables" (briefly, MLT cables), the optical fibers are grouped in multiple bundles, the optical fibers of each bundle being loosely arranged within a respective buffer tube. Typically, the buffer tubes may be arranged around a central strength member and stranded according to a closed or open helix (S-Z arrangement).

Further, a so-called "blown fiber tube cables" (briefly, BLT cables), similarly to the MLT cables, comprises a plurality of buffer tubes stranded together (or arranged around a central strength member) according to a closed or open helix (S-Z arrangement). The buffer tubes are designed to receive single optical fibers (or bundles of optical fibers) blown inside the buffer tubes.

Both in CLT cables and in MLT cables, the external sheath may comprise strength members (typically made of steel or fiber reinforced resin) embedded within the sheath's thickness and placed at diametrically opposed positions. Moreover, or alternatively, the optical fibers or buffer tubes may be surrounded by flexible strength members arranged radially externally of the optical fibers. Flexible strength members may comprise aramid yarns or the like.

The term "user" is to be herein construed as meaning any generic user (or device of a user) connectable to the telecommunication network. User devices may comprise for example modems, set-top boxes for cable TV (for instance IPTV—Internet Protocol TeleVision), IP phones and similar devices.

The term "signal bearing optical fiber" or "signal bearing optical fiber segment" is to be herein construed as meaning the optical fiber or the optical fiber portion of an optical fiber contained in the optical cable and coupled, either directly or indirectly, with a network element, e.g. an Optical Line Terminal or OLT able to bear the optical signal from the Optical Line Terminal to a user.

The term "idle optical fiber" or "idle optical fiber segment" is to be herein construed as meaning the optical fiber or the optical fiber portion of an optical fiber, contained in the optical cable, and not directly coupled to the Optical Line Terminal.

With reference to the embodiment shown in the example of FIG. 1 of the present invention, a single optical cable 105 (even though embodiments of the present invention many be applied to microcables or micromodules included in an optical cable) comprising at least one optical fibers $110_1$, preferably a plurality of optical fibers $110_1$ to $110_z$ (where z≥1, for example z=8), is used for propagating one or more optical signals along a "last mile" of a telecommunication network (i.e., a so-called "Fiber To The x", FTTx, architecture, such as for example a "Fiber To The Premises", FTTP, architecture) to a certain number of users (e.g., users in a same building and/or in buildings facing a same street and/or in buildings standing in a same block etc.).

As known, a size of the optical cable 105 depends on the number of optical fibers $110_1$ to $110_z$ which are accommodated therein.

In the optical fibers network (for example a Gigabit Passive Optical Network, or GPON) of the embodiment depicted in the example of FIG. 1, at least one optical fiber $110_x$ (which has to be considered the signal bearing optical fiber coupled, either directly or indirectly, with a network element) in the optical cable 105 is interrupted, or segregated in the jargon, at a first (primary) branch point $115_{x|1}$ along the cable (the first branch point $115_{x|1}$ is schematized by a loosely circular closed line in FIG. 1), wherein the first branch point $115_{x|1}$ is provided for connecting a certain number of respective user (not shown) located in a same area (e.g., a floor of a building or a whole building) to the telecommunication network.

Preferably, the optical cable 105 sheath is cut, for example by making a window or opening therein, in order to expose the optical fibers $110_1$ to $110_z$ contained therein.

The segregation of the optical fiber $110_x$ at the first branch point $115_{x|1}$ allows obtaining an optical fiber portion (hereinafter referred to as first optical fiber segment) $110_{x|1}$ upstream the first branch point $115_{x|1}$ and a remaining optical fiber portion (from which at least a second optical fiber segment $110_{x|2}$ may be obtained, as described in the following) downstream the first branch point $115_{x|1}$ (possible uses of the remaining optical fiber portion downstream the first branch point $115_{x|1}$ will be described shortly hereafter).

At the first branch point $115_{x|1}$, a first main optical splitter $120_{x|1}$ is provided (being a 1:2 optical splitter in the example of FIG. 1). The first main optical splitter $120_{x|1}$ comprises one input and two outputs (other examples may be 1:4, 1:8, 1:16, 1:32 etc. optical splitters).

The input of the first main optical splitter $120_{x|1}$ is coupled with the first optical fiber segment $110_{x|1}$.

Preferably, said one output of the first main optical splitter $120_x$ may be (directly) coupled to a respective user which receives the first split optical signal outputted by the first main optical splitter $120_{x|1}$.

In this way, optical signals transmitted (e.g., by the OLT) into the first optical fiber segment $110_{x|1}$ and propagating through it towards the first main optical splitter $120_{x|1}$ at the first branch point $115_{x|1}$ are split (e.g., replicated in a passive optical network) at each of the (two, in the considered example) outputs of the first main optical splitter $120_{x|1}$ into (two) corresponding split optical signals. Each one of the split optical signals is provided to a respective user.

In another embodiment of the invention (not shown), one output of the first main optical splitter $120_{x|1}$ (in the exemplary case the first main optical splitter $120_{x|1}$ is a 1:2; at least one output of the first main optical splitter in case the latter has more than two outputs, being e.g. a 1:4, or a 1:8, etc., optical splitter) is coupled to an input of a first cascaded optical splitter (for example a 1:8 optical splitter, which has one input and eight outputs (other examples are 1:2, 1:4, 1:16, 1:32 etc. optical splitters). The outputs of the first cascaded optical splitter are then coupled to the (eight) users located in the same area mentioned above.

By "cascaded optical splitter" it is meant an optical splitter arranged downstream an optical splitter (such as the main optical splitter $120_{x|1}$), i.e. having its input fiber connected to an output fiber of a preceding optical splitter.

In this way, optical signals transmitted (e.g., by the OLT) into the first optical fiber segment $110_{x|1}$ and propagating through it towards the first main optical splitter $120_{x|1}$ at the first branch point $115_{x|1}$ are split (e.g., replicated in a passive optical network) at each of the (two, in the considered example) outputs of the first main optical splitter $120_{x|1}$ into (two) corresponding split optical signals. One of the (two) split optical signals outputted by the first main optical splitter $120_{x|1}$ (first split optical signal) is further split into corresponding (eight in the considered example) optical signals by the first cascaded optical splitter. Each one of the further split optical signals is provided to a respective user device.

Advantageously, the remaining output of the first main optical splitter $120_{x|1}$ (at which a second split optical signal is made available) is expediently connected to the remaining optical fiber portion of the optical fiber $110_x$ downstream the first branch point $115_{x|1}$, thereby the remaining optical fiber portion of the optical fiber $110_x$ downstream the first branch point $115_{x|1}$ is not left unused, being instead advantageously re-used to distribute optical signals to further users. The remaining optical fiber portion of the optical fiber $110_x$ can be either the signal bearing optical fiber or the idle optical fiber.

In a further embodiment of the present invention, the remaining output of the first main optical splitter $120_{x|1}$ is connected to an optical fiber segment of another interrupted optical fiber (for example, a segment of a further idle optical fiber).

Preferably, in order to increase the number of users that can be served by means of one of the optical fibers of the optical cable, one or more further branch points (not shown at a certain distance from the branch point $115_{x|1}$) similar to the branch point $115_{x|1}$ are provided along the optical cable 105, wherein at each of said further branch points the remaining optical fiber portion of the optical fiber $110_x$ downstream the first branch point $115_{x|1}$ is further segregated and coupled to users.

Other optical fibers $110_1$ to $110_z$ contained in the cable 105, such as the optical fibers $110_{x+1}$, $110_{x+2}$, in the example of FIG. 1, can be treated like the optical fiber $110_x$, at respective branch points $115_{x|2}$ and $115_{x|3}$, with respective optical splitters $120_{x|2}$ and $120_{x|3}$.

Advantageously, the structure just described may be iterated for a number of optical splitters comprising m outputs and wherein the optical cable 105 comprises at least m−2 idle fibers (or idle fiber segments).

Preferably, a generic n-th optical fiber segment is coupled, at one end thereof, with a second output of a (n−1)-th main optical splitter of a previous (n−1)-th branch point and the other end of the n-th optical fiber segment is coupled to an input of a n-th main optical splitter of a n-th branch point.

Therefore, any optical signals transmitted (e.g., by the OLT) through the first optical fiber segment $110_{x|1}$ and propagating through it is split at the branch point $115_{x|1}$ (by a corresponding main optical splitter $120_{x|1}$) into respective first and second split optical signals at the outputs of the respective main optical splitter $120_{x|1}$. The first split optical signal is provided to the users coupled with a first output of the respective main optical splitter $120_{x|1}$. The second split optical signal is propagated to a respective next branch point through a respective segment obtained by segregating the remaining optical fiber portion of the generic optical fiber $110_x$. The same applies for the optical fibers $110_1$ to $110_z$ contained in the cable 105, such as the optical fibers $110_{x+1}$, $110_{x+2}$, in the example of FIG. 1.

Preferably, in correspondence of each branch point, a branch box, or tapping box, is provided. The tapping box (not shown in detail) substantially comprises a box-shaped enclosure, e.g. of generically rectangular or square shape, comprising an opening provided with a closure cover, attachable or hinged to the box-shaped enclosure. The tapping box contains the main optical splitter and the cascaded optical splitter provided at each branch point, as well as optical fiber connector(s).

The invention embodiment described up to now allows connecting a relatively high number of users by exploiting even just one of the optical fibers of an optical cable.

Figure 2:
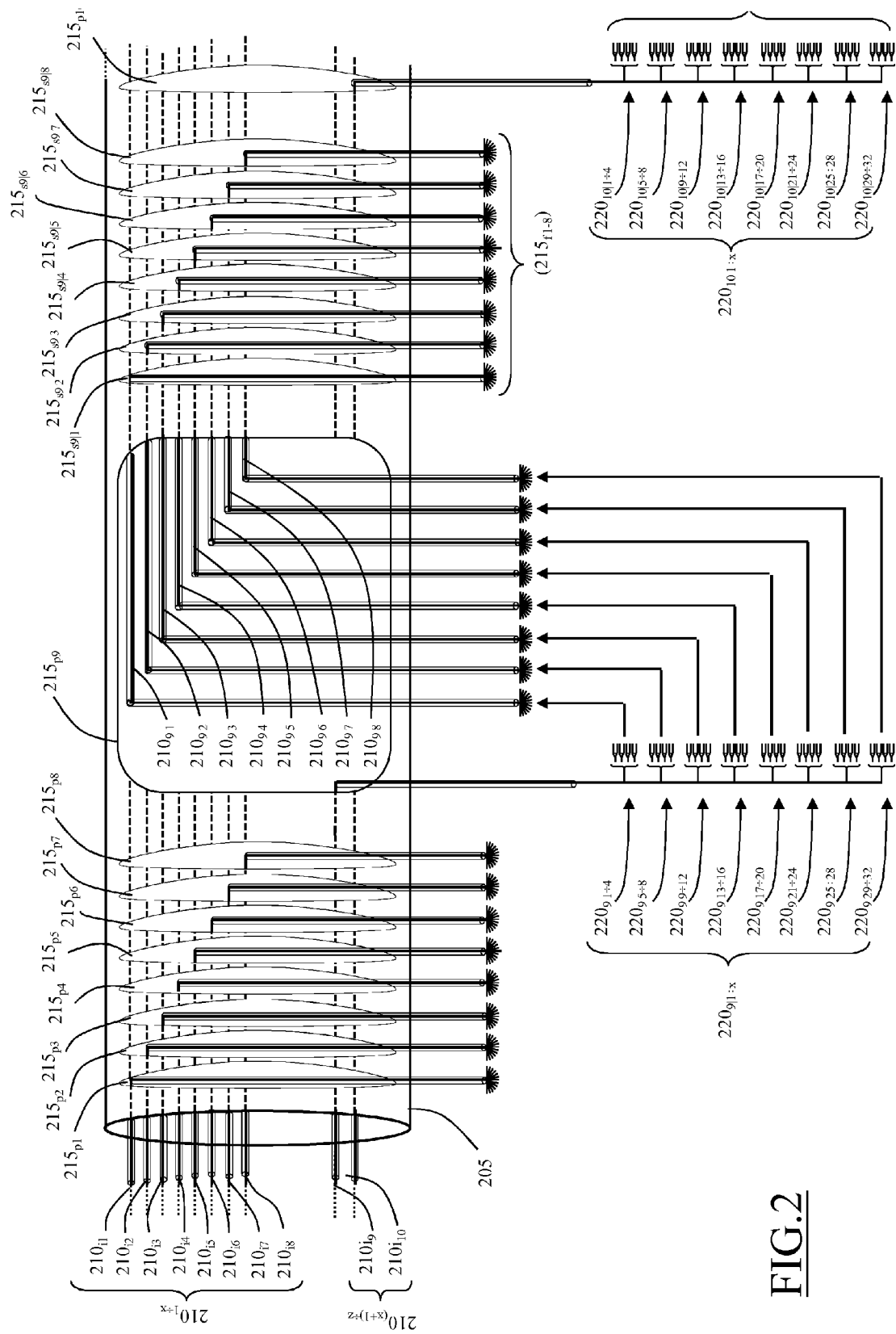
FIG. 2 is a schematic diagram of optical fibers deployment according to another embodiment of the present invention, in the exemplary case of a multi-tube optical cable.

Turning now to FIG. 2, it is a schematic diagram of an optical fibers deployment according to another embodiment of the present invention, in the exemplary case of a multi-tube optical cable.

The optical fibers deployment of FIG. 2 differs from the optical fibers deployment previously described essentially in what follows (wherein similar elements are denoted by similar numeral references).

An optical cable 205 comprises one or more optical fiber modules (microcables or micromodules) $210_{1+z}$ (wherein z indicates the overall number of optical fiber modules contained in the optical cable 205; z=10 in the example of FIG. 2). Each optical fiber module $210_{1+z}$ comprises a tube containing a number a optical fibers, for example each optical fiber module $210_{1+z}$ contains a=32 optical fibers (other examples of the optical fiber module may comprise 2, 4, 8, 12, 16, 24 etc. optical fibers).

In one exemplary implementation, at a branch point along the optical cable 205 an optical fiber module $210_{1+x}$ is accessed, generally extracted from the cable, and the relevant optical fibers of the first subset $210_{1+x}$ are segregated, so as to distribute optical signals (injected by the OLT with which the optical fibers are coupled) to user devices located substantially at same positions corresponding to the branch points (e.g., a same floor of a building or a same building in a street).

In particular, the example of FIG. 2 shows a first subset $210_{1+x}$ of optical fiber modules comprising eight optical modules, i.e. the optical modules $210_1$ to $210_8$.

Considering the generic optical fiber module of the first subset $210_{1+x}$, downstream the respective branch point (where the optical fibers contained in the considered module are segregated) there remain idle optical fiber portions, namely those portions of the optical fibers of the module after the cut which do not carry an optical signal (downstream a branch point there remains an idle module portion).

Expediently, the idle optical fiber portions of one or more of the modules of the cable 205 are not left unused, being instead exploited for distributing optical signals to further user devices, as described in the following.

The optical fibers of a second subset $210_{(x+1)+z}$ of optical fiber modules contained in the optical cable 205 are coupled (either directly or indirectly) at one of their ends to the OLT (or other equivalent network element) in order to bear optical signals to be distributed to a plurality of user devices located at different positions from each other (e.g., different floor of a building or different buildings in a street).

In the example of FIG. 2 the second subset of optical fiber modules comprises the optical fibers $210_9$ and $210_{10}$.

The optical fibers of each optical fiber module $210_1$ to $210_x$ of the first subset $210_{1+x}$ of modules have been interrupted, at a respective primary branch point $215p_1$ to $215p_x$, provided for connecting a certain number of respective user devices (not shown) located in same areas corresponding to the branch point $215p_1$ to $215p_x$ (e.g., a floor of a building or a whole building) to the telecommunication network. The interruption of the fibers of the optical fiber modules $210_1$ to $210_x$ at the respective primary branch points $215p_1$ to $215p_x$ allows obtaining, for each of the optical fiber modules $210_1$ to $210_x$, a respective first optical fiber module segment $210i_1$ to $210i_x$, respectively, upstream the respective primary branch point $215p_1$ to $215p_x$, which respective first optical module segment $210i_1$ to $210i_x$ is connected with the OLT, and a respective (idle) remaining optical module portion downstream the respective primary branch point $215p_1$ to $215p_x$.

At each primary branch point $215p_{1+x}$ the optical fibers of the respective first optical fiber module segment $210i_{1+x}$ are coupled (either directly or indirectly, e.g. through relevant optical splitters) with one or more respective user devices.

Optical fibers of each optical fiber module $210_{(x+1)}$ to $210_z$ of the second subset $210_{(x+1)+z}$ of modules are interrupted at a respective primary branch point $215p_{(x+1)}$ to $215p_z$. The segregation of the fibers of the optical fiber modules $210_{(x+1)}$ to $210_z$ of the second subset $210_{(x+1)+z}$ of modules at the respective primary branch points $215p_{(x+1)}$ to $215p$, allows obtaining, for each of the optical fiber modules $210_{(x+1)}$ to $210_z$, a respective first optical fiber module segment $210i_{(x+1)}$ to $210i_z$ upstream the respective primary branch point $215p_{(x+1)}$ to $215p_z$, which respective first optical module segment $210i_{(x+1)}$ to $210i_z$ is connected with the OLT, and a respective (idle) remaining optical module portion downstream the respective primary branch point $215p_{(x+1)}$ to $215p_z$.

In the example of FIG. 2, the optical fiber modules $210_9$ and $210_{10}$ are interrupted at the respective primary branch points $215p_9$ and $215p_{10}$ thus obtaining first optical fiber module segments $210i_9$ and $210i_{10}$.

The generic primary branch point $215p_{(x+1)}$, at which the optical fibers of the optical fiber module $210_{(x+1)}$ of the second subset $210_{(x+1)+z}$ are interrupted, is provided with a number a (i.e. equal to the number of optical fibers contained in each optical fiber module) of optical splitters $220_{(x+1)|1+a}$, being a 1:8 optical splitter in the example of FIG. 2 each having one input and eight outputs (other examples are 1:2, 1:4, 1:16, 1:32 etc. optical splitters). The input of each one of the a optical splitters $220_{(x+1)|1+a}$ located at the generic primary branch point $215p_{(x+1)}$ is coupled with a respective one of the a optical fibers contained in the respective first optical module segment $210i_{(x+1)}$ of the optical fiber module $210_{(x+1)}$ of the second subset $210_{(x+1)+z}$ of optical fibers modules.

As visible in FIG. 2, the 32 optical fibers contained in the first optical fiber module segment $210i_9$ are each coupled with the input of a respective optical splitter $220_{9|1+32}$.

In this way, optical signals injected (e.g., by the OLT) into a generic one of the optical fibers contained in the first optical fiber module segment $210i_{(x+1)}$ of the second subset $210_{(x+1)+z}$ of optical fiber modules, like the first optical fiber module segment $210i_9$, and propagating through it in downlink to the respective optical splitter $220_{(x+1)|1+a}$, like the optical splitter $220_{9|1+32}$, are split at each of the (e.g. eight) outputs thereof into (eight) corresponding split optical signals.

Each one of optical fiber segments contained in the remaining optical module portions of the optical fiber modules $210i_{1+x}$ of the first subset $210_{1+x}$ of modules downstream the respective primary branch point $215p_1$ to $215p_x$ are expediently coupled with a respective one of the outputs of the a optical splitters $220_{(x+1)|1+a}$ provided at the primary branch point $215p_{(x+1)}$.

As visible in FIG. 2, the 32 optical fiber segments contained in each one of the remaining (idle) optical module portions of the optical fiber modules $210_{1+8}$ of the first subset of modules are each coupled with a respective output of the a optical splitters $220_{9|1+32}$ provided at the primary branch points $215p_9$.

In order to propagate the split optical signals available at the output of the a optical splitters $220_{(x+1)|1+a}$ to a number of user devices through the optical fibers contained in the remaining optical module portions of the optical fiber modules $210_{1+x}$ of the first subset of modules, each one of the remaining optical module portions of the optical fiber modules $210_{1+x}$ is further interrupted at a respective secondary branch point $215s_{(x+1)|1+x}$. In this way, second (idle) optical module segments $210_{(x+1)|1+x}$ are obtained downstream the respective primary branch points $215p_{(x+1)}$, and further (idle) remaining optical module portions are obtained at the secondary branch points $215s_{(x+1)|1+x}$, respectively.

As visible in FIG. 2, each one of the remaining optical module portions of the optical fiber modules $210_{1+8}$ is further interrupted at a respective secondary branch point $215s_{9|1+8}$ obtaining a respective second optical module segment $210_{9|1+8}$.

At each secondary branch point $215s_{(x+1)|1+x}$ the optical fibers contained in the respective second optical module segment $210_{1+x|(x+1)}$ are coupled (either directly or indirectly, e.g. through relevant optical splitters) with one or more respective user devices.

The procedure just described with reference to the optical fiber module $210_{(x+1)}$ (optical fiber module $210_9$ referring to FIG. 2) of the second subset of optical fibers modules may be iterated for any other optical fiber module $210_{(x+2)+z}$ (such as for example the optical fiber module $210_{10}$ of the FIG. 2) of the second subset of optical fibers modules by exploiting the further remaining optical module portions obtained at the secondary branch points $215s_{(x+1)|1+x}$, respectively.

The embodiment of FIG. 2 allows deploying a local loop adapted to serving a relatively high number of user devices with a very limited number of optical fibers $210_{1+z}$ (instead of e.g. using respective optical fibers for connecting the OLT not only with each one of the respective primary branch points $215p_{x+1}$ to $215p_x$, but also with and respective optical fibers for connecting the OLT with each one of secondary branch points $215s_{(x+1):z|1+x}$) of the optical cable 105, thus enabling the use of an optical cable with less fibers requiring a very limited physical space for the deployment of the optical cable 105.

Indeed, any optical signals injected (e.g., by the OLT) into optical fibers of the first optical fiber modules segments $210i_{(x+1)}$ to $210i_z$ of the second subset $210_{(x+1)+z}$ of optical fiber modules may be propagated to a number of secondary branch points $215s_{(x+1)+z|1+x}$ equal to a number x of the optical fiber modules $210_{1+x}$ of the first subset $210_{1+x}$ of optical fiber modules—eight in the example of FIG. 2. Therefore, any optical signals injected (e.g., by the OLT) into optical fibers of the first optical fiber modules segments $210i_{(x+1)}$ to $210i_z$ may be propagated to a number of user devices equal to the number x of the optical fiber modules $210_{1+x}$ of the first subset $210_{1+x}$ multiplied by the number a of optical fibers contained in each optical fibers module.

Obviously, the optical cable 205 comprising ten optical fiber modules $210_{1+10}$ shown in FIG. 2 has to be construed as a mere, non-limitative, example of implementation of an embodiment of the present invention. Indeed, in other embodiments according to the present invention (not shown) optical cables comprising a different number of optical fiber modules or modules having containing different number of optical fibers may be used. The optical splitters may have different number of outputs one from the other in order to be connected to a different number of secondary branch points and/or of user device to be served (according to implementation requirements, e.g. a different number of user devices have to be served each branch point).

It should be noted that, thanks to the subdivision of the optical fiber modules $210_{1+z}$ in the first subset $210_{1+x}$ of optical fiber modules and in the second subset $210_{(x+1)+z}$ of optical fiber modules $210_{(x+1)+z}$ together with the different coloration of the optical fibers $210_{1+z}$, the deployment of the optical cable 105 results faster and less prone to errors.

It should further be noted that, the optical fiber modules of the first subset $210_{1+x}$ of optical fiber modules and the optical fiber modules of the second subset $210_{(x+1)+z}$ of optical fiber modules $210_{(x+1)+z}$ of the optical fiber modules $210_{1+z}$ are not necessarily consecutive fiber modules but any fiber module $210_{1+z}$ may be used as optical fiber modules of the first subset $210_{1+x}$ of optical fiber modules or as optical fiber modules of the second subset $210_{(x+1)+x}$ As for the embodiment of FIG. 1, preferably, in correspondence of each branch point, a branch box, or tapping box, is provided. The tapping box (not shown in detail) substantially comprises a box-shaped enclosure, e.g. of generically cylindrical, rectangular or square shape, comprising an opening provided with a closure cover, attachable or hinged to the box-shaped enclosure. The tapping box contains the main optical splitter and can contain also the cascaded optical splitter provided at said branch point, as well as optical fiber connector.

The invention claimed is:

1. A method for connecting a number of users with at least one signal bearing optical fiber contained in an optical cable, the method comprising:
   a) interrupting the signal bearing optical fiber at a first branch point, obtaining a first optical fiber segment upstream of the branch point and a second optical fiber segment downstream of the branch point;
   b) providing an optical splitter at the branch point, the optical splitter comprising an input and two outputs;
   c) coupling the first optical fiber segment with the input of the optical splitter;
   d) coupling a first output of the optical splitter with a first user outside of the optical cable;
   e) coupling a second output of the optical splitter with a downstream optical fiber segment of an interrupted optical fiber contained inside of the optical cable; and
   f) coupling the downstream optical fiber segment with at least one further user at a further branch point downstream the first branch point.

2. The method according to claim 1, wherein the downstream optical fiber segment of an interrupted optical fiber is the second optical fiber segment.

3. The method according to claim 1, wherein the downstream optical fiber segment of an interrupted optical fiber is an idle optical fiber segment of a further optical fiber.

4. The method according to claim 1, further comprising:
   g) coupling the first optical fiber segment at one end thereof with a network element for propagating one or more optical signals from/to the network element to/from the user and/or the further user.

5. The method according to claim 4, further comprising:
   h) interrupting the second optical fiber segment at the further branch point;
   i) providing a further optical splitter at the further branch point, the further optical splitter comprising an input and at least two outputs;
   j) coupling the second optical fiber segment with the input of the further optical splitter provided at the further branch point; and
   k) coupling one of the at least two outputs of the further optical splitter with the at least one further user.

6. The method of claim 5, further comprising repeating f), h), i), j), k) in correspondence of at least one subsequent branch point downstream the further branch point.

7. The method according to claim 3, wherein d) coupling a first output of the optical splitter with a first user comprises:

coupling the first output of the optical splitter with a further idle optical fiber segment of an another further optical fiber contained in the optical cable.

8. The method according to claim 3, wherein e) coupling a second output of the optical splitter with a downstream optical fiber segment of an interrupted optical fiber contained in the optical cable comprises:
   segregating the downstream optical fiber segment at the further branch point, obtaining the idle optical fiber segment upstream the further branch point.

9. The method according to claim 3, wherein the at least one signal bearing optical fiber comprises a plurality of signal bearing optical fiber grouped in optical fiber modules and wherein:
   a) interrupting the signal bearing optical fiber at a first branch point, obtaining a first optical fiber segment upstream of the branch point and a second optical fiber segment downstream of the branch point comprises:
   segregating all the optical fibers of a same optical fiber modules at the same branch point, and wherein
   b) and c) providing an optical splitter at the branch point and coupling the first optical fiber segment with the input of the optical splitter comprises providing a respective optical splitter for each optical fiber of the same optical fiber module, and coupling the first optical fiber segment of each optical fiber of the same module with the input of the respective optical splitter.

10. The method according to claim 9, wherein the downstream optical fiber segment of an interrupted optical fiber comprises a plurality of downstream optical fiber segments grouped in idle optical fiber modules contained in the optical cable, wherein the further branch point comprises a respective further branch point for each one of the idle optical fiber modules, and wherein f) coupling the downstream optical fiber segment with at least one further user at a further branch point downstream the first branch point comprises:
   coupling each of the downstream optical fiber segments grouped in idle optical fiber modules with at least one further user at the respective further branch point of the idle optical fiber modules downstream the first branch point.

11. The method according to claim 1, wherein the at least one signal bearing optical fiber comprises a plurality of signal bearing optical fiber grouped in optical fiber modules and wherein:
   a) interrupting the signal bearing optical fiber at a first branch point, obtaining a first optical fiber segment upstream of the branch point and a second optical fiber segment downstream of the branch point comprises:
   segregating all the optical fibers of a same optical fiber modules at the same branch point, and wherein
   b) and c) providing an optical splitter at the branch point and coupling the first optical fiber segment with the input of the optical splitter comprises providing a respective optical splitter for each optical fiber of the same optical fiber module, and coupling the first optical fiber segment of each optical fiber of the same module with the input of the respective optical splitter.

12. The method according to claim 11, wherein the downstream optical fiber segment of an interrupted optical fiber comprises a plurality of downstream optical fiber segments grouped in idle optical fiber modules contained in the optical cable, wherein the further branch point comprises a respective further branch point for each one of the idle optical fiber modules, and wherein f) coupling the downstream optical fiber segment with at least one further user at a further branch point downstream the first branch point comprises:

coupling each of the downstream optical fiber segments grouped in idle optical fiber modules with at least one further user at the respective further branch point of the idle optical fiber modules downstream the first branch point.

* * * * *